Jan. 7, 1936.　　　　　B. M. SHORT　　　　2,026,597
TIRE COVER
Filed Sept. 9, 1932
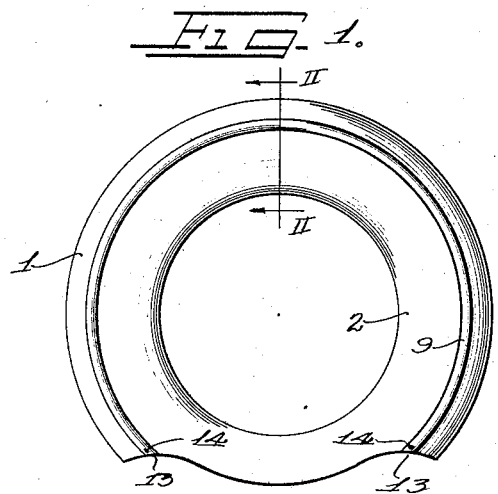
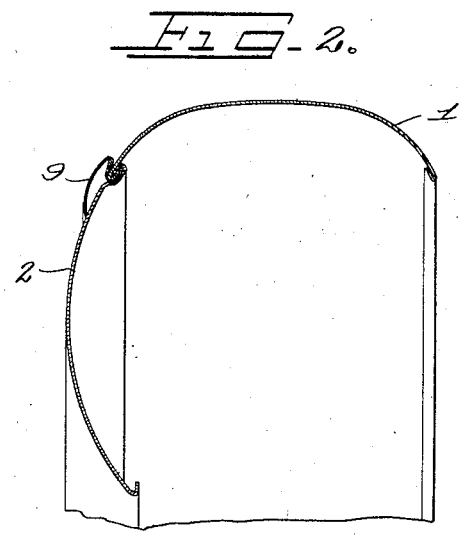
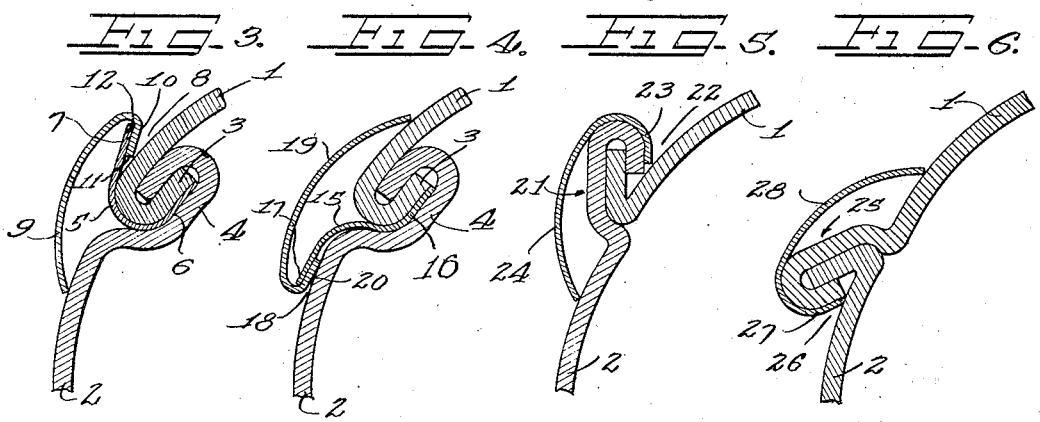
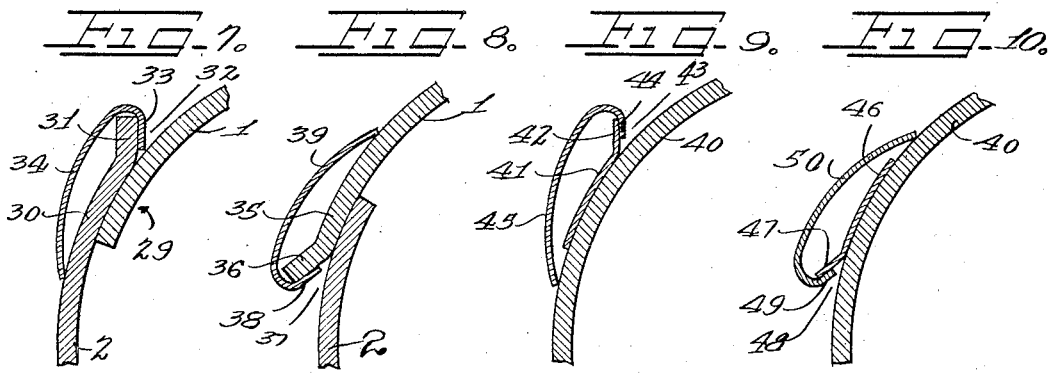
Inventor
Bladen M. Short.
by Charles W. Filler
Attys.

Patented Jan. 7, 1936

2,026,597

UNITED STATES PATENT OFFICE 2,026,597

TIRE COVER

Bladen M. Short, Detroit, Mich., assignor to Lyon Cover Company, Detroit, Mich., a corporation of Michigan Application September 9, 1932, Serial No. 632,387

11 Claims. (Cl. 150—54)

This invention relates to tire covers and concerns more particularly the securement of molding or beading thereto.

It is an object of this invention to provide a tire cover consisting of a tread covering part and a side wall covering part interlocked together, the interlocking connection being such as to provide an anchor for the attachment of a strip of molding so arranged as to conceal the connection.

It is another object of the invention to provide a tire cover with means for anchoring a strip of molding.

It is a further object of the invention to provide means associated with a tire cover, whereby a strip of molding may be attached and held in position by its own resilience.

In carrying out the invention into practice in accordance with one exemplification, the tread and side members of a cover are secured together by a seam such as a lock seam, the cooperating parts of the seam extending inwardly of the members, and an anchoring piece or pieces interlocked with said portions and having a margin projecting outwardly free of the members, whereby a pocket is afforded between the freely extending margin of the anchor and the adjacent outer surface of one of the members. The strip of molding is formed with a return bent margin which extends in an outward direction relative to the center of the cover, if the pocket opens inwardly, or in an inwardly extending direction, if the pocket opens outwardly, and is made contractible and expansible so that the same may be initially flexed to allow the return bent margin to clear the free margin of the anchor and, upon release of the flexing pressure, snap into the pocket. The molding is preferably of such transverse extent that it completely covers not only the free margin of the anchor but the entire juncture of the tire cover members, thereby giving the cover the appearance of being an integral unseamed member.

In accordance with a further form of the invention, the interlocked portions of the seam project outwardly of the members and at an acute angle thereto, providing an inwardly or an outwardly opening pocket, as desired, the strip of molding cooperating therewith in exactly the same way in which it cooperates with the free margin of the anchor above described.

In accordance with another form of the invention, the tire cover members are connected by a lap joint, the marginal portion of the outer lap being offset at an angle to provide an inwardly or an outwardly opening pocket, as desired, for receiving the offset or return bent portion of the strip.

In accordance with a fourth form of the invention, the cover is formed from an integral member and a separate anchoring strip is secured exteriorly thereof and provided with an offset margin extending inwardly or outwardly, as desired, for cooperation with the strip of molding or beading.

Further objects and advantages of the invention will appear as the description proceeds.

The invention (in preferred forms) is illustrated in the drawing and hereinafter more fully described.

On the drawing:

Figure 1 is an elevational view of a tire cover provided with a strip of molding applied in accordance with the principles of the present invention.

Figure 2 is an enlarged sectional view taken approximately in the plane designated by the line II—II in Figure 1.

Figure 3 is an enlarged view of the lock seam and associated molding of Figure 2.

Figures 4 to 10 inclusive illustrate modified forms of the invention.

Referring now more particularly to the drawing, wherein the same parts are designated throughout by the same reference characters so far as is practicable, the tire cover shown in Figure 1 comprises a tread covering part 1 and a side wall covering part 2 interlocked at their adjacent margins 3 and 4, respectively, by a lock seam. Prior to the seaming operation, an anchoring element 5 in the form of a preferably continuous ring-like strip is sandwiched at 6 between the margins 3 and 4 so that when the seaming operation is completed, the element 5 is firmly interlocked with the parts 1 and 2. The element 5 has a marginal portion which extends outwardly as at 7 to provide an outwardly opening pocket or groove 8 between the same and the part 1.

A preferably transversely arcuate strip of molding 9, preferably coextensive with the seam, is provided with an inwardly extending return bent margin 10 for disposition in the recess or pocket 8. The strip 9 need not be resilient since the margin 10 at one end of the strip may be inserted in the pocket 8 at one end and slid along the margin 7 of the element 5 until the entire length of the return bent margin or flange 10 is disposed in the circular groove or pocket 8, the parts being positioned as shown in Figure 1. It is preferred, however, that the strip 9 be resilient in order that attachment thereof to the anchoring element 5 may be facilitated. To this end, the strip 9 is formed so that its normal diameter at its outer edge 11 is substantially less than that of the outer edge 12 of the margin 7. In applying the strip 9, the same is expanded over the edge 12, whereupon pressure on the strip 9 is released and the margin 10 allowed to snap into the pocket 8. It is preferred that the strip 9 exert some pressure inwardly even after the margin 10 is disposed in the pocket 8, in order that rattling between the parts may be entirely avoided. This pressure is preferably such as to allow some sliding movement of the strip 9 relative to the anchor 5, upon application of force in the direction of sliding movement, in order that, after the strip 9 is snapped in position, it may be shifted if necessary in order to bring the ends 13 of the strip 9 flush with the ends of the seam as shown in Figure 1. When this is done, the ends 13 are riveted or spotwelded in position as shown at 14.

It will be appreciated that while I have shown a tire cover whose seam is not in a complete circle, the seam could be made complete or substantially complete circumferentially and the ends of the strip of molding 9 could be lapped and thus welded or otherwise secured in position, or a connecting strip could be applied in telescopic relation to the adjacent ends of the strip end secured to said ends in any suitable fashion.

In the form of the invention appearing in Figure 4, the anchoring element 15 is substantially S-shaped, one margin 16 being sandwiched between the margins 3 and 4 of the cover parts 1 and 2, respectively, and the free margin 17 of the anchoring element 15 extending inwardly and forming with the adjacent portion of the cover part 2 a pocket 18 for receiving the outwardly extending return bent margin 20 of the strip of molding 19. In all other respects, the construction appearing in Figure 4 is substantially identical with that of Figure 3 and further elaboration is therefore superfluous.

Another form of the invention is shown in Figure 5, wherein the lock seam 21 projects outwardly of the cover parts 1 and 2 and extends at an acute angle with the tread covering part 1 to provide a pocket 22 in which the return bent and inwardly extending margin 23 of the strip of molding 24 is received.

In Figure 6, the construction is identical with that shown in Figure 5 except that the lock seam 27 extends at an acute angle with the side wall covering part 2 to provide an inwardly opening pocket 26 for the reception of the return bent outwardly extending margin 27 of the beading 28.

In Figure 7, the tire cover parts 1 and 2 are connected by a lap joint 29, the lap 30 of the side plate 2 being outside and having its margin 31 offset at an acute angle with the cover part 1 to provide an outwardly opening pocket 32 for the reception of the inwardly extending return bent margin 33 of the bead 34.

In the form of Figure 8, the construction of Figure 7 is reversed in that the lap 35 of the tread covering part 1 is outermost and has its margin 36 offset and extending at an acute angle to the tire cover part 2 to provide a pocket 37 for the reception of the outwardly extending return bent margin 38 of the molding 39.

A still further modification of the invention is illustrated in Figure 9, wherein the tire cover 40 is constructed of an integral piece of metal of a shape which, if desired, may correspond with that appearing in Figure 1. A strip of metal or the like designated 41 extends circumferentially of the cover 40 and has its outer margin 42 offset at an acute angle to the cover 40, thereby providing an outwardly opening pocket 43 for the reception of the inwardly extending return bent margin 44 of a strip of molding 45.

In Figure 10, the construction of Figure 9 is reversed in that the anchoring strip 46 has its inner margin 47 offset at an acute angle with respect to the cover 40 to provide an inwardly opening pocket 48 for the reception of the outwardly extending return bent margin 49 of the strip of molding 50.

The beading or molding in the forms of the invention appearing in Figures 3, 5, 7 and 9 are substantially identical in construction and method of attachment. The forms of beading appearing in Figures 4, 6, 8 and 10 are substantially identical with each other in construction and method of application to the cover and, when made resilient, each is applied by first being contracted and then allowed to expand by itself so that the return bent margin will slip or snap into the pocket provided by the cover appearing in the different views. Regardless which modification is employed, the cover will have substantially the same appearance when the beading is applied, namely that illustrated in Figure 1.

It will be understood that while the molding of Figures 1 to 8 inclusive is applied at the juncture between the tread covering and side wall covering parts of the cover, the molding could be applied at any other point where the parts of a cover may be joined. Moreover, while, in Figures 9 and 10, the molding is applied where the tread covering and side wall covering portions of an integral tire cover merge, it will be understood that with this construction the beading may be applied at any location whatever on this or any other tire cover.

Accordingly, while Figure 1 is described above as illustrating a tire cover to which the beading 9 is applied, it is obvious that a similar view of a cover employing any of the other constructions hereinbefore described will have an appearance which is substantially identical with that of Figure 1.

Each strip of molding is preferably so formed that when its marginal flange is in the associated groove, its other longitudinal edge engages the adjacent surface of the cover as shown. If desired, the strip may be transversely resilient and formed so that said longitudinal edge is yieldably held in substantially biting engagement with the cover.

The molding is applicable not only to a built-up cover as shown in Figures 1 to 8 and a single piece cover as shown fragmentarily in Figures 9 and 10, but also to each of the parts of a multipart cover such as one comprising a side plate and a separate rim.

I am aware that many changes may be made and numerous details of construction may be varied through a wide range without departing from the principles of this invention, and I, therefore, do not purpose limiting the patent granted hereon, otherwise than is necessitated by the prior art.

I claim as my invention:

1. Tire cover construction comprising tread and side wall protecting portions, an anchor substantially coextensive with said portions and having an offset margin extending at an acute angle with one of said portions to provide a circumferential pocket, and a coextensive strip of molding cooperating with the cover to substantially entirely enclose said anchor and having a portion fitting in said pocket.

2. Tire cover construction comprising tread and side wall protecting portions, an anchor substantially coextensive with said portions and having an offset portion extending at an acute angle with one of said portions to provide a circumferential pocket, and a coextensive strip of molding cooperating with the cover to substantially entirely enclose said anchor and having a portion fitting in said pocket, the anchor first portion extending in the direction of the axis of the cover and the molding portion extending in the opposite direction, the strip of molding when thus positioned having a diameter which is less than its normal diameter and being resilient, whereby it is automatically held in position.

3. Tire cover construction comprising a pair of interlocked arcuate members, an anchoring element interlocked with said members and forming with one of said members a pocket, and an arcuate strip of molding having a portion disposed in said pocket.

4. Tire cover construction comprising a pair of arcuate members having interlocked margins, an anchoring element having one margin interlocked with the tire cover members and extending therebetween, a second margin of said element extending free of said members and forming with one of said members an arcuate pocket, an arcuate strip of molding substantially coextensive with the interlocked portions of said members and concealing the juncture thereof and also the free margin of said element, said strip having a flange disposed in said pocket, said flange being resilient whereby the same is resiliently retained in said pocket.

5. Tire cover construction comprising a pair of arcuate members having interlocked portions, an anchoring element interlocked with said portions and having a part forming with one of said members an arcuate pocket, an arcuate strip of molding having a portion disposed in said pocket, said strip being generally concavo-convex in cross section and having another portion in engagement with one of the members when the first portion of the strip is disposed in said pocket.

6. Tire cover construction comprising a pair of arcuate members having interlocked margins, an anchoring element having one margin interlocked with the tire cover members and extending therebetween, a second margin of said element extending free of said members and forming with one of said members an arcuate pocket, an arcuate resilient strip of molding concealing the juncture of said members and the free margin of said element, said strip having a portion disposed in said pocket and being substantially concavo-convex in cross section, of normally less curvature than when said portion is disposed in said pocket, and having another portion in engagement with one of said members when the first portion is thus disposed, whereby separation of said other portion from said member is yieldably resisted by the inherent resilience of the strip.

7. Tire cover construction comprising a pair of arcuate members having interlocked margins, an anchoring element interlocked with said margins and having a portion forming with one of said members an arcuate pocket, an arcuate resilient bead having a flange disposed in said pocket under tension, said bead being substantially concavo-convex in cross section and of normally less transverse curvature than when said flange is disposed in said pocket, and having a portion in engagement with the other member when said flange is thus disposed, whereby separation of the second portion from said other member is yieldably resisted by the inherent resilience of the strip.

8. Tire cover construction comprising a pair of interlocked members, an anchoring element interlocked with said members and forming with one of said members an arcuate radially outwardly opening pocket, an arcuate bead substantially coextensive with the interlocked portions of said members and concealing the juncture thereof and also said element, said strip being expansible and contractible and having a portion disposed in said pocket.

9. Tire cover construction comprising a pair of arcuate members, an anchoring element interlocked with said members and having a portion spaced from one of said members, an arcuate bead having a part disposed in the space between said portion and member, said part being resilient whereby the same may be snapped into and retained in said pocket, said portion extending away from the direction of the axis of the cover.

10. A tire cover comprising a substantially arcuate concavo-convex member for covering a portion of a spare tire, a substantially arcuate anchor secured to the convex surface of said member and forming with said member a substantially circular recess, and a substantially circular flexible bead contracted into telescoped relation with said anchor and having a portion disposed in said recess one side edge of said bead engaging in said recess and being the only edge connected to said member.

11. Tire cover construction comprising a pair of arcuate members, an anchoring element interlocked with said members and having a portion spaced from one of said members, an arcuate bead having a part disposed in the space between said portion and member, said part being resilient whereby the same may be snapped into and retained in said pocket.

BLADEN M. SHORT.

CERTIFICATE OF CORRECTION.

Patent No. 2,026,597.  January 7, 1936.

BLADEN M. SHORT.

It is hereby certified that error appears in the printed specification of the above numbered patent requiring correction as follows: Page 2, first column, line 30, for "end" read and; page 3, first column, line 13, claim 2, strike out the word "first"; and that the said Letters Patent should be read with these corrections therein that the same may conform to the record of the case in the Patent Office.

Signed and sealed this 25th day of February, A. D. 1936.

Leslie Frazer (Seal)  Acting Commissioner of Patents.